July 2, 1963

R. COESTER

TURBO MACHINE

Re. 25,409

Original Filed Oct. 9, 1958

2 Sheets-Sheet 1

Inventor:
Robert Coester by
Wenderoth, Lind + Ponack,
Attys.

TURBO MACHINE

Original Filed Oct. 9, 1958 2 Sheets-Sheet 2

Inventor:
Robert Coester by
Wenderoth, Lind & Ponack
Attys.

United States Patent Office

Re. 25,409
Reissued July 2, 1963

25,409
TURBO MACHINE

Robert Coester, Zumikon, Zurich, Switzerland, assignor to Maschinenfabrik Benninger A.-G., Uzwill, Switzerland Original No. 2,968,436, dated Jan. 17, 1961, Ser. No. 766,229, Oct. 9, 1958. Application for reissue Aug. 22, 1961, Ser. No. 134,052
Claims priority, application Switzerland Oct. 10, 1957
10 Claims. (Cl. 230—125)

Matter enclosed in heavy brackets [ ] appears in the original patent but forms no part of this reissue specification; matter printed in italics indicates the additions made by reissue.

The present invention relates to a pressure generating turbo machine and more particularly to a cross [current] *flow* blower in which a space is divided by a conveyor rotor into a high pressure and a low pressure chamber. The invention aims to improve in turbo machines of the mentioned type the efficiency and to increase the specific conveying pressure, more particularly for small specific conveying volume.

It is well known, that cross current blowers attain a relatively high efficiency for high loads. However, for smaller conveying volumes the pressure and the efficiency decrease rapidly. Decisive is the dimensionless volume figure $$\varphi=\frac{Q}{D.b.u}$$

in which Q is the conveyed volume, D the rotor diameter, b the rotor width in axial direction and u the circumferential speed of the rotor periphery. Small volume figures $\varphi$ are often desirable for example in ventilators which shall have the least possible current speeds or in blowers and pumps with small conveying volumes with respect to the delivery pressure.

A prime object of the present invention thus consists in the realization of an improvement of the efficiency of turbo machines which shall work with small $\varphi$.

To this end the turbo machine according to the present invention is characterized by means producing at the rotor periphery, at the transition of the rotor vanes from the low pressure chamber to the high pressure chamber a depression with respect to the low pressure chamber.

Figure 3:
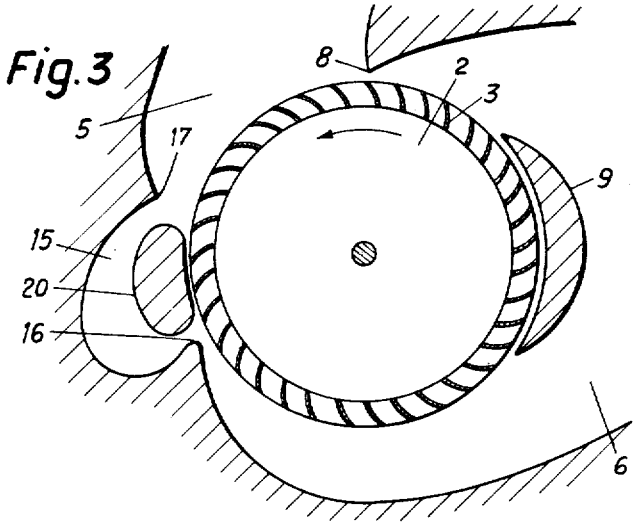
Figure 4:
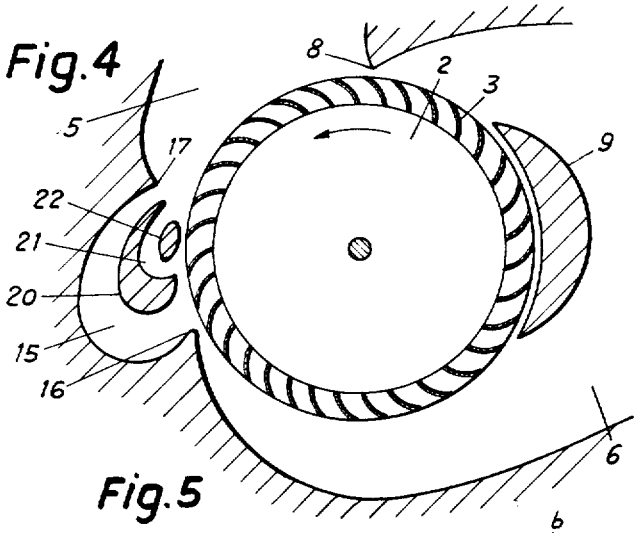
Figure 5:
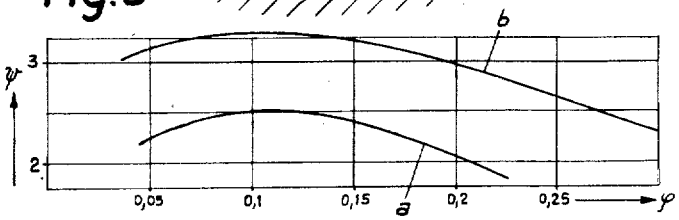

Other features and advantages of the machine according to the invention will become apparent from the descripton now to follow, of preferred embodiments thereof, given by way of example and in which reference will be made to the accompanying purely diagrammatical drawings in which:

FIGS. 1, 2, 3 and 4 illustrate cross-sections taken through several different machines, and FIG. 5 shows a diagram.

Figure 1:
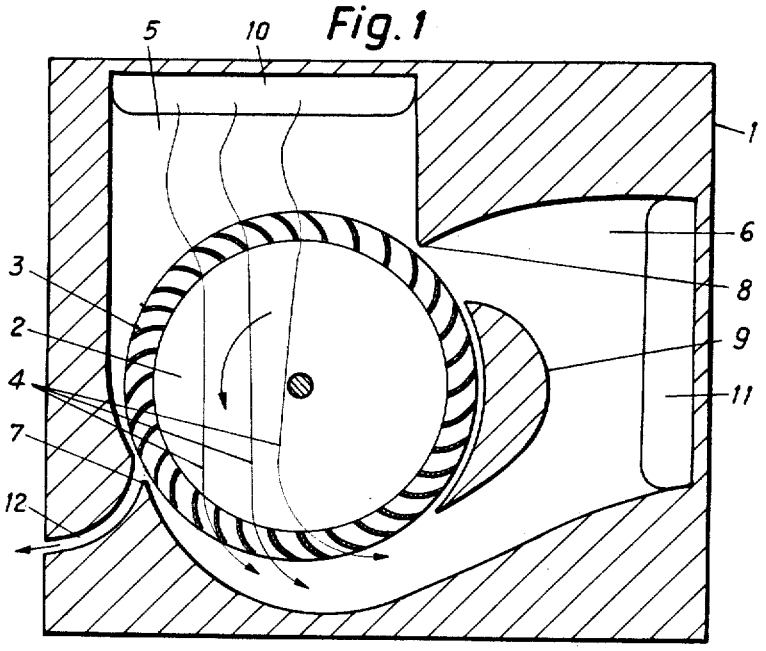

The turbo machine illustrated in FIG. 1 in cross-section comprises a casing *or housing* 1 locating a rotor 2. Vanes *or blades* 3 are equidistantly [provided on the circumference] *spaced around the periphery* of this rotor 2, *the rotor being mounted for rotation in one direction. The housing is around the rotor 2 and it extends along the periphery thereof.* The blower rotor is traversed crosswise by the medium to be conveyed as is diagrammatically indicated by the current lines 4. The rotor 2 divides the inner space of the [casing] *housing* into a high pressure chamber *or fluid outlet* 6 and into a low pressure chamber *or fluid inlet* 5, whereby the casing approaches at the points 7 and 8 the immediate vicinity of the outer limitation of the rotor. A covering body 9 may be arranged in the high pressure chamber *or outlet* 6 and may already result in an improvement of the efficiency of the turbo machine. The action of this covering body as well as its dimensioning has been described in my *Patent No. 3,033,441* [copending application 657,846, filed May 8, 1957]. The medium *or fluid* to be conveyed may enter perpendicularly to the axial extension of the rotor into the low pressure [chamber] *inlet* 5 and leave from the high pressure [chamber] *outlet* 6. It is also possible to evacuate and to feed the [medium] *fluid* through conduits extending parallelly to the rotor axis and indicated diagrammatically at 10 and 11 in FIG. 1.

It has been found that a substantial improvement of the efficiency of the machines of the described type is obtained by producing a depression immediately in front of the projection 7 of the inner [casing] *housing* wall, seen in direction of rotation, i.e. *in the zone* where the rotor [vanes] *blades* pass from the low pressure chamber *or inlet* to the high pressure chamber *or outlet*. A depression produced [at this point] *in this zone* has an accelerating action onto the current leaving the rotor after point 7 in direction of rotation, whereby the current losses in the rotor are greatly diminished and simultaneously the total pressure produced in the rotor is substantially increased. The depression at this point may be produced for example by the provision of a slotted opening 12 through which is sucked away a corresponding amount of the conveyed [medium] *fluid*. The slot may to this end be connected for example with a pump. The slot may also be tapered in the manner of a diffuser, whereby it is also possible to obtain a suction effect. In addition thereto it is also possible to obtain the desired depression by a corresponding conformation of the [casing] *housing* wall at the transition [point] *zone* of the rotor vanes between the low pressure chamber and the high pressure chamber. Examples for this are represented in FIGS. 2–4 whereby similar parts are designated by like references.

Figure 2:
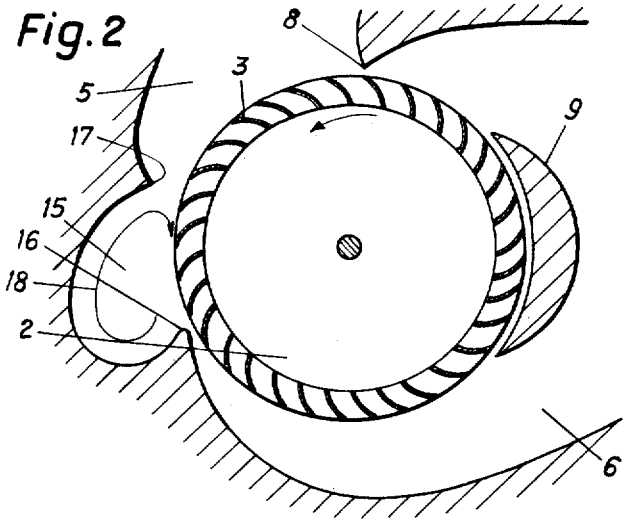

In the blower represented in section in FIG. 2 a sack-like recess *or chamber* 15 is provided in the [casing] *housing* wall *in the zone* where the rotor vanes pass from the low pressure [chamber] *inlet 5* to the high pressure [chamber] *outlet 6*. This [recess] *chamber* 15 is bordered towards the low pressure [chamber] *inlet 5* by a projection 17 directed towards *the periphery of* the rotor but not necessarily attaining the latter. [The] *A* corresponding projection 16 of the inner wall of the [casing] *housing* between the [recess] *chamber* 15 and the high pressure [chamber] *outlet* 6 preferably extends to the immediate vicinity of the outer [circumference] *periphery* of the rotor.

With such conformation of the [casing] *housing* wall at the mentioned transition [point] *zone* a whirl *or swirl* is originated at this point *or zone and within the chamber 15* as indicated by the arrow 18. This [whirl] *swirl* produces as it has been proved by tests and measurements the desired depression. In all cases it should be [tended] *attempted* to bring the center of this [whirl] *swirl* as near as possible to the rotor periphery.

*The swirl chamber 15 communicates with the periphery of the rotor 2 in a zone between a first cut-off point at 16 near the rotor periphery and adjacent the position of enry of the blades of rotor 2 into said high pressure outlet 6 and a second cut-off point at 17 near the rotor periphery and adjacent the position of exit of the blades of the rotor 2 from said low pressure inlet 5. Said swirl chamber 15 is defined by a substantially imperforate boundary wall having its major portions generally concave. The shape of said chamber 15 and the positions of said cut-off points at 16 and 17 are such that fluid leaving the blades of the rotor 2 at the first cut-off point 16 is deflected into the chamber 15 causing a swirl, while the second cut-off point 17 is shaped to direct the fluid inwardly through the blades, the reduced pressure caused by the*

*inward flow at 17 causing increased intake of fluid through the inlet at 5.*

*The portion of the wall of the swirl chamber 15 that is adjacent said first cut-off point 16 intersects the housing wall at an acute included angle to provide for an inclination such that the velocity vector of the fluid at said portion of the wall has a component in the direction of rotation of the rotor. This inclined wall portion therefore ensures movement of fluid into said swirl chamber in the direction to initiate the described swirling movement.*

*There can be variations in the shape of the wall of the swirl chamber 15, but said wall preferably has a portion adjacent the first cut-off point that has a radius of curvature smaller than that of the remainder of said wall. Desirably the said wall of said swirl chamber 15 has the shape of a portion of a spiral extending away from the rotor periphery at said first cut-off point 16 and toward the rotor periphery at said second cut-off point in a direction opposite to the direction of rotor rotation, the portion of smaller radius of curvature being located adjacent said first cut-off point.*

*The second cut-off point at 17 is preferably spaced from the rotor periphery to a greater extent than is the first cut-off point 16. A portion of the wall of said inlet opening 5 adjacent said second cut-off point at 17 is preferably so inclined as to direct the fluid from the inlet near said point 17, together with the fluid leaving the swirl chamber, in a substantially radial direction toward the periphery of the rotor. The velocity vector of the fluid near the cut-off point 17 may have a component parallel to and in the direction opposite to the direction of movement of the periphery of the rotor.*

FIG. 3 illustrates an improvement of the blower shown in FIG. 2. In this variant an approximately oval body 20 is arranged in the recess *or chamber* 15 so as to almost lie with a flat side against the periphery of the rotor 2. This body may adapt itself to the shape of the [recess] *chamber* 15 and it results in a further approach of the [whirl] *swirl* to the rotor periphery.

FIG. 4 shows still a further improvement of such an insert body 20. As is visible from this figure, this body is provided with a recess 21 having a shape similar to that of the [recess] *chamber* 15. In a further variant a still further oval body 22 may be arranged in this recess 21.

The improvement of the output obtained is visible from the diagram of FIG. 5. On the abscissa there is reported the dimensionless volume figure $$\varphi=\frac{Q}{D.b.u}$$

while on the ordinate there is reported the also dimensionless pressure figure $$\psi=\frac{p_2-p_1}{\frac{\delta}{2}\cdot u^2}$$

whereby $p_2-p_1$ is the pressure difference obtained in the apparatus, $\delta$ the density of the conveyed medium and u the peripheral speed of the rotor. Curve a has been obtained with a blower similar to that of FIG. 1 yet without means for producing a depression at the transition point *or zone* of the roctor vanes between the low pressure chamber *or inlet* and the high pressure chamber *or outlet*. Curve b has been obtained with a turbo machine according to FIG. 3. As is easily seen the values of curve b are improved to an average of 20% over those of curve a.

Only by way of example there shall now be indicated the pressure ratios which may lead to good results. The pressure in the low pressure chamber *or inlet* is indicated by $p_1$, the pressure in the high pressure chamber *or outlet* is indicated by $p_2$, while the pressure at the transition point *or zone* of the rotor vanes *or blades* from the low pressure chamber *or inlet* to the high pressure chamber *or outlet* is designated by $p_u$. The difference $p_1-p_u$ may for example be 0.7 while $p_2-p_1$ may be 3.

I claim:

1. A transverse flow blower, comprising a rotor, a housing around said rotor and extending along the periphery of the rotor, said rotor having a plurality of blades spaced around the periphery thereof and having a hollow annular center into which the spaces between the blades open, said rotor being mounted in said housing for rotation in one direction, a low pressure inlet opening into said rotor housing along one portion of the periphery of said rotor, and a high pressure outlet opening out of said rotor housing from another portion of the periphery of said rotor, the rotor separating said inlet and outlet, and said housing having a swirl chamber therein opening into said rotor housing along the periphery of said rotor from a point immediately preceding the point where the blades of said rotor enter said high pressure outlet and back along the periphery of said rotor toward said low pressure inlet, the swirl chamber having a wall defining the chamber which has a shape of a portion of a spiral extending outwardly away from said rotor and back along the periphery of said rotor in a direction opposite to the direction of rotation of said rotor with the portion of the smaller radius of curvature being toward said high pressure outlet, said wall intersecting said housing along the periphery of said rotor adjacent said point immediately preceding the point where the blades of said rotor enter the high pressure outlet to form a first cut-off point, and intersecting the wall of said housing along the periphery of the rotor adjacent the inlet to form a second cut-off point, whereby fluid being drawn into said inlet is deflected inwardly through the blades of said rotor by said second cut-off point, thereby causing a reduced pressure in said swirl chamber which causes the fluid to be moved outwardly between the blades of the rotor into said swirl chamber, so that fluid is moved through the spaces between the blades as the blades enter the outlet.

2. A transverse flow blower as claimed in claim 1 in which said swirl chamber has a body therein which is substantially oval in cross-section and having one edge extending along and adjacent to the periphery of said rotor and the remaining edges spaced from the wall of said swirl chamber.

3. A transverse flow blower as claimed in claim 2 in which said body has a second swirl chamber therein opening out of the edge of said body which is adjacent said rotor, said second swirl chamber having a wall with the shape of a portion of a spiral with the portion of the smaller radius of curvature being toward said high pressure chamber, and a further body in said second swirl chamber in said body having a substantially oval cross-section with one edge extending along and adjacent to the periphery of said rotor and the remaining edges spaced from the wall of the second swirl chamber in said body.

*4. A transverse flow blower, comprising a rotor, a housing around said rotor and extending along the periphery of the rotor, said rotor having a plurality of blades spaced around the periphery thereof and having a hollow annular center into which the spaces between the blades open, said rotor being mounted in said housing for rotation in one direction, a low pressure inlet opening into said rotor housing along one portion of the periphery of said rotor, and a high pressure outlet opening out of said rotor housing from another portion of the periphery of said rotor, the rotor separating said inlet and outlet, and said housing having a swirl chamber therein opening into said rotor housing along the periphery of said rotor from a first point preceding and adjacent the point where the blades of said rotor enter said high pressure outlet and back along the periphery of said rotor toward said low pressure inlet, said swirl chamber having a generally*

*smooth concave wall which extends outwardly away from said rotor and which intersects the wall of said housing at an acute included angle along the periphery of said rotor at said first point to form a first cut-off point, and said chamber wall also intersecting the wall of said housing along the periphery of the rotor adjacent the inlet to form a second cut-off point which deflects fluid from said swirl chamber inwardly through the blades of said rotor, and said swirl chamber wall adjacent said first cut-off point providing for a velocity vector of said outwardly moving fluid which has a component in the direction of rotation of the rotor.*

*5. A transverse blower as claimed in claim 4, wherein the wall of said swirl chamber has a portion adjacent the first cut-off point that has a radius of curvature smaller than that of the remainder of said wall.*

*6. A transverse blower as claimed in claim 4, wherein a body substantially oval in cross-section is located in said swirl chamber which body has one face extending along and adjacent the periphery of said rotor and has its other faces spaced from the wall of said chamber.*

*7. A transverse blower wheel as claimed in claim 4, wherein the second cut-off point is spaced from the rotor periphery to a substantially greater extent than is the first cut-off point.*

*8. A transverse blower as claimed in claim 4, wherein said inlet opening has a wall portion adjacent said second cut-off point which is inclined inwardly and in the downstream direction with respect to a radial plane through the axis of rotor rotation and through said second cut-off point, said inclined wall portion being effective for inwardly deflecting the fluid adjacent the last said cut-off point.*

*9. A transverse flow blower as claim in claim 8 in which said body has a second swirl chamber therein opening out of the edge of said body which is adjacent said rotor, said second swirl chamber having a generally concave wall which extends outwardly from said rotor, and a further body in said second swirl chamber in said body having a substantially oval cross-section with one edge extending along and adjacent to the periphery of said rotor and the remaining edges spaced from the wall of the second swirl chamber in said body.*

*10. A transverse flow blower as claimed in claim 4 wherein said inlet opening has a wall portion adjacent said second cut-off point which is angularly related to the wall of said swirl chamber adjacent said second cut-off point to provide for substantially parallel and adjacent inwardly flowing air streams from said swirl chamber and said inlet opening through said rotor blades.*

References Cited in the file of this patent or the original patent

UNITED STATES PATENTS

| | | |
|---|---|---|
| 507,445 | Mortier | Oct. 24, 1893 |
| 1,045,732 | Nash | Nov. 26, 1912 |
| 1,429,044 | Nash | Sept. 12, 1922 |
| 2,537,344 | Gruss | Jan. 9, 1951 |

FOREIGN PATENTS

| | | |
|---|---|---|
| 477,345 | Germany | June 12, 1929 |
| 929,668 | Germany | June 30, 1955 |
| 291,007 | Great Britain | Aug. 2, 1928 |